June 11, 1963
C. B. KREKELER
3,093,365
CUTTING BIT HOLDERS
Filed Nov. 12, 1957
2 Sheets-Sheet 1
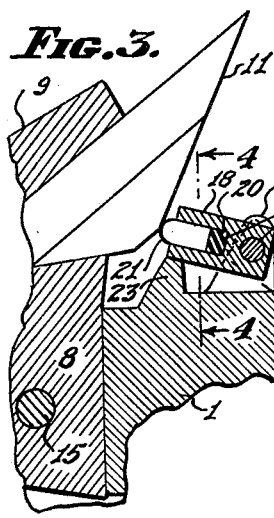
FIG. 3.
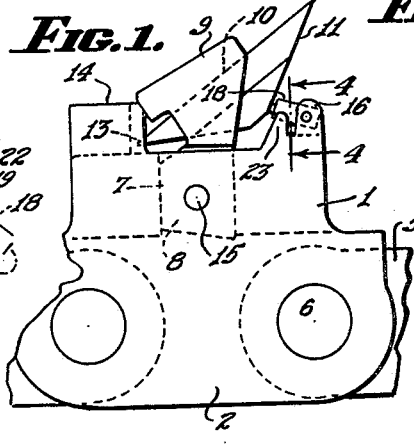
FIG. 1.
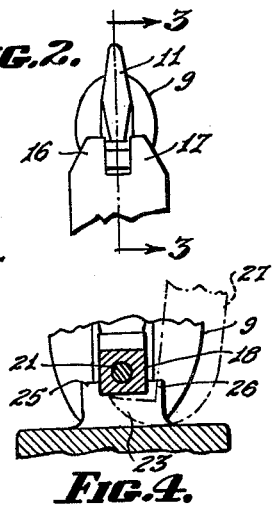
FIG. 2.
FIG. 4.
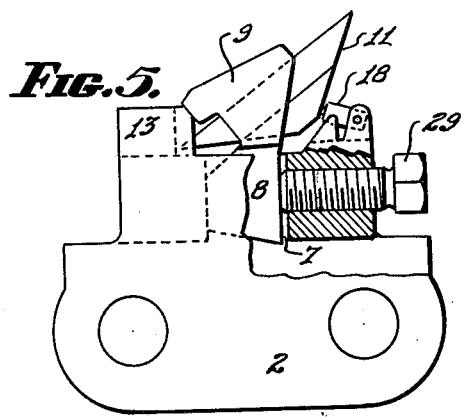
FIG. 5.
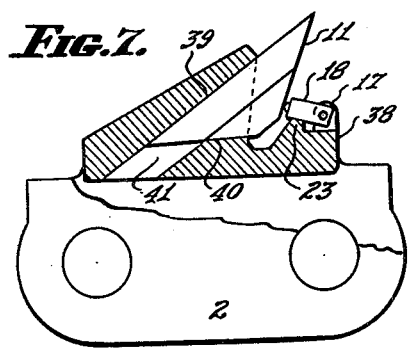
FIG. 7.
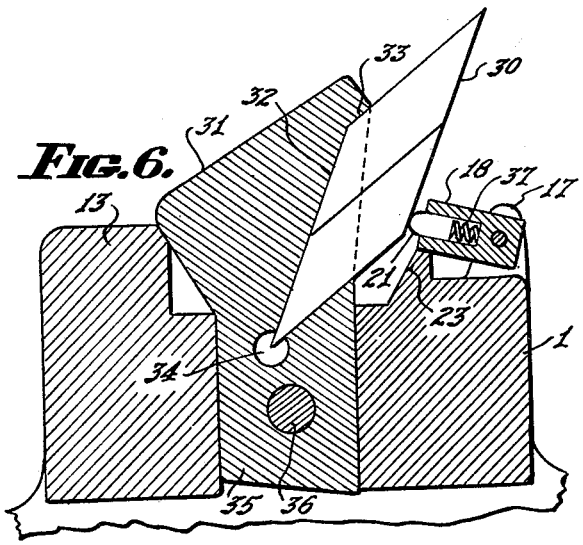
FIG. 6.
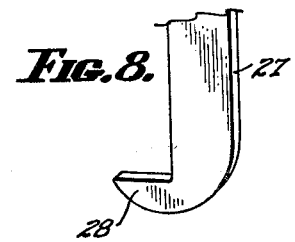
FIG. 8.
INVENTOR.
CLAUDE B. KREKELER,
BY Allen & Allen
ATTORNEYS.

June 11, 1963  C. B. KREKELER  3,093,365
CUTTING BIT HOLDERS
Filed Nov. 12, 1957  2 Sheets-Sheet 2

INVENTOR.
CLAUDE B. KREKELER,
BY Allen & Allen
ATTORNEYS.

United States Patent Office 3,093,365
Patented June 11, 1963

3,093,365
CUTTING BIT HOLDERS
Claude B. Krekeler, Cincinnati, Ohio, assignor to The Cincinnati Mine Machinery Co., Cincinnati, Ohio, a corporation of Ohio
Filed Nov. 12, 1957, Ser. No. 695,771
6 Claims. (Cl. 262—33)

The invention is concerned with cutting or mining machinery wherein cutting devices are engaged directly or indirectly in socket members on driven cutting heads or on driven chains. In some apparatus of this type, cutting bits are engaged directly in the socket members; but such cutting bits have been relatively complicated and expensive forged structures, configured to present a head carrying a cutting point and an integral shank for engagement in the socket. The wear on cutting bits is very rapid in mining machinery, and they have to be renewed very frequently. Relatively inexpensive cutting bits have been devised, usually having a cutting point at each end so that when one cutting point has been worn away, the bit may be reversed for the use of the other cutting point before the structure is discarded. But such cutting bits have in the past required the use of cutting bit holders which are, in turn, engaged in socket members. These cutting bit holders have been relatively complicated and expensive structures; and the operation of reversing or renewing the cutting bits has hitherto required disassembling and reassembling operations which are time consuming and inconvenient.

This invention has for a fundamental object the provision of structures in which cutting bits may be installed, reversed, or removed directly and without the disassembling and reassembling operations to which reference has been made. Some of the structures of this invention employ cutter bit holders which may be removed for replacement, while in some of the structures of this invention the cutter bits are engaged directly in suitably configured parts of the socket members.

In either event, however, it is an object of the invention to provide means for supporting and holding cutter bits in place, which means act directly on the cutter bits themselves and function in simple engagement and release operations to hold the bits in place or permit their removal without any disassembling steps and without the use of any separate parts as locking or fastening means.

Yet another object of the invention is the provision of structures having the above advantages, and employing resilient means for retaining the bits in place, which resilient means are readily releasable.

These and other objects of the invention, which will be set forth hereinafter or will be apparent to one skilled in the art upon reading these specifications, are accomplished by that structure and arrangement of parts of which certain exemplary embodiments will now be described. Reference is made to the accompanying drawings wherein:

FIG. 1 is an elevational view of a cutter chain link element having a socket member and showing a bit holder engaged in the socket member and carrying a reversible bit.

FIG. 2 is a partial end elevation of the same structure.

FIG. 3 is a partial sectional view taken along the section line 3—3 of FIG. 2.

FIG. 4 is a partial sectional view taken along the section line 4—4 of FIG. 1.

FIG. 5 is a side elevation, with a part in section, of a similar structure showing another means for fastening the bit holder in place.

FIG. 6 is a longitudinal sectional view of a socket member and bit holder designed to hold another type of double-ended bit.

FIG. 7 is an elevational view with parts in section of a chain link element with a socket member, the cutter bit being directly engaged in the socket member.

FIG. 8 is a partial perspective view of a releasing tool.

Figure 9:
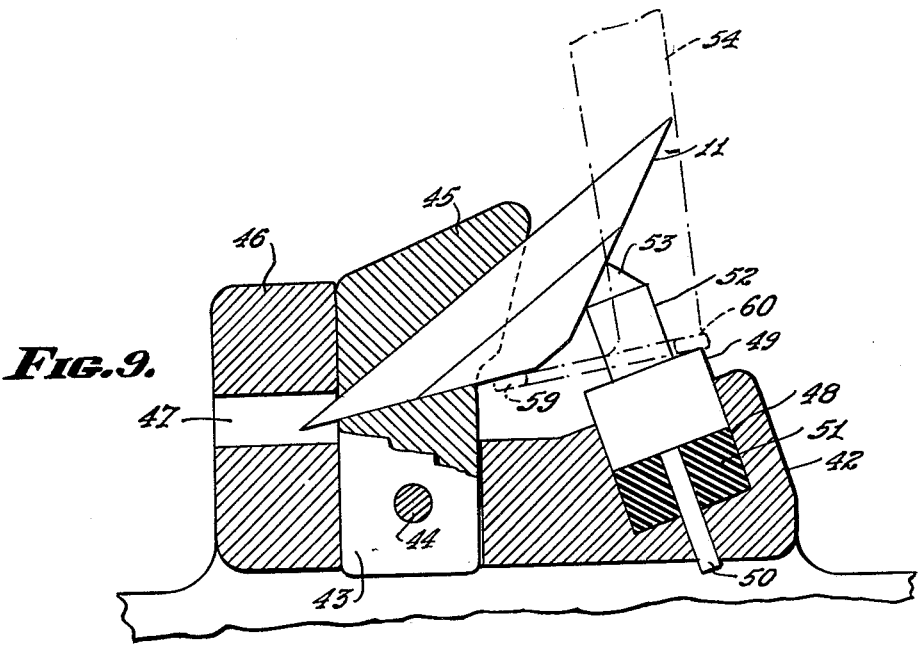
FIG. 9 is a longitudinal sectional view of another form of bit retaining structure as hereinafter described.

While the invention will be described herein in connection with a cutting chain having link elements which carry the socket members, it will be understood that the invention is not so limited and that the socket members may be located upon or formed integrally with cutting heads which are not chains.

Referring first to FIG. 1, there is shown a chain link element configured to present a socket member 1 and spaced cheeks, one of which is indicated at 2. In this type of chain, the socket bearing link elements are connected together by single cheek members or connectors, one of which is indicated at 5. The ends of the connectors are engaged between the spaced cheeks of the first mentioned link element where they are pivoted by means of pintles 6 passing through aligned openings in the cheeks. The invention is applicable to other types of chains also, including those in which the several socket bearing link elements have spaced cheeks at one end and single cheeks at the other and are pivoted directly together by means of the pintles.

The socket element 1 of the structure of FIG. 1 is provided with a perforation 7 which receives the shank 8 of a bit holder having a head 9. The head has a recess 10 which receives some portion of the body of a double-ended cutter bit 11. This cutter bit is indicated as of the type formed by cutting rolled steel rod stock into sections by means of cuts which lie aslant to the major axis of the rod. The rod itself is substantially diamond-shaped in cross-section; and in the exemplary embodiment the cutting bit is trapezoidal in side elevation, presenting at either end cutting points 12 and 13. The bit is hardened after formation, and either may be used in this condition or tipped at the cutting points with some hard alloy such as tungsten carbide or Carboloy, as well known in the art.

The bit holder 9 may be configured to engage and hold bits of different shapes and sizes and various types of holders may be used. One excellent type of holder is that described and claimed in the copending application of the present inventor, Serial No. 538,942, filed October 6, 1955, entitled Manufacture of Bit Holders, now Patent No. 2,827,275.

In the particular embodiment, a rear portion of the head 9 engages an upward extension 14 of the socket member which serves as an abutment, so that the rearward cutting strains are transmitted directly by the bit holder head to the socket member. The shank of the bit holder may be held in the socket member perforation 7 by any suitable means. One such means involves the use of a steel pin 15.

As shown in FIGS. 1 to 4, a fastening means is provided for holding the bit in the bit holder. A pair of ears 16 and 17 extends upwardly from the forward end of the socket member or block 1. A toggle member 18 lies partially between these ears, an end of the toggle member being pivoted to the ears by a pivot pin 19. The other end of the toggle member is provided with a longitudinal bore 20 in which a latching plunger 21 is slidably mounted. Resilient means is located behind the latching plunger in the bore. This resilient means may be a spring or like element, but is preferably a mass 22 of rubbery material such as natural rubber, any of the butadiene copolymers, or chloroprene (neoprene).

The toggle member 18 can be swung out of the way as indicated in dotted lines in FIG. 3 to permit free removal and replacement of the bit 11. When a bit is in place, the toggle member may be swung in the other direction to lock the bit in the bit holder. The dimensions of the bits are such that the latching plunger 21 must be depressed in order to permit full engagement; and the toggle member comes to rest in the locking position upon an abutment 23 formed on the socket member 1. As shown in FIG. 4, this abutment is provided with ears 25 and 26 to inhibit lateral movement of the toggle member. In swinging to this position shown in solid lines in FIGS. 1 and 3, the toggle member must pass dead center as respects that portion of the surface of the cutter bit 11 which is engaged by the latching plunger 21. Thus, the toggle member will not be displaced upwardly during the use of the structure and it serves to hold the bit 11 firmly in engagement with the bit holder head 9. It will be understood that the cutting strains are rearwardly and downwardly in the cutting operation in which the chain member is used. Hence, the cutting strains are not imposed upon the toggle element. The toggle member may, however, be deliberately removed from fastening position by a prying action. This is most conveniently exerted by a tool 27 having a laterally extending end portion 28 which may be inserted beneath the toggle and between the abutment 23 and the ears 16 and 17 for the purpose of prying the toggle member upwardly.

With different forms of bit holder, the extent to which the body of the bit is engaged within the head may vary. In some instances the unused end of the bit may lie wholly within the head. In other instances it may project beyond the rear portion of the head. If it projects as shown in FIGS. 1 and 5, the skilled worker in the art will understand that the abutment portion 13 of the socket member will be suitably recessed to accept and protect the unused point.

FIG. 5 indicates that other means may be used for holding the bit holder shank in the socket member. Like parts are given like index numerals. In this embodiment a set screw 29 is located at the front of the shank and serves to hold the shank with its rear edge against the rear face of the perforation 7. Other forms of fastening means may be used including but without limitation such fastening means as are shown in the copending application of Claude B. Krekeler, Serial No. 652,562, filed May 16, 1957, now abandoned, and entitled Cutter Bit and Socket Structures, the said copending application having been assigned to applicant's assignee.

FIG. 6 is a sectional view of a structure designed to hold in cutting position a double-ended bit 30 of conventional rhomboidal elevational shape. Like parts have again been given like index numerals. The bit holder has a head 31 which is recessed as at 32 to receive a portion of the body of the cutter bit, the bit holder head having an overhang 33 to prevent upward movement of the bit. The bit holder may be recessed as at 34 to protect the unused point of the cutter bit. The shank 35 of the holder may be pinned at 36 in the opening socket member 1. The same type of toggle element 18 may be employed pivoted to the ears 16 and 17 and providing the latching plunger 21. In the particular instance the latching plunger is shown as resiliently mounted by means of a spring 37, although for reasons given above a body of resilient substance is regarded as preferable. The same type of abutment 23 determines a position of the toggle which is past dead center, as described above.

In many instances the provision of a bit holder which is separate from the socket member or block is of some advantage, for while the initial cost is greater, the replacement of a broken bit holder is generally cheaper than the repair or replacement of a chain block. However, it is within the scope of the invention to provide for the direct engagement of a bit in the socket member or block of a chain element or cutter head. Such a structure is illustrated in FIG. 7 where the block or socket member 38 is recessed as at 39 to receive a portion of the body of a trapezoidal bit 11. The recess 39 has a surface 40 to establish gauge and to resist downward movement of the bit, and is further recessed as at 41 to protect the unused point of the bit. The same toggle structure 18 hereinabove described is employed in connection with the same ear and abutment means.

If FIG. 7 is considered in connection with FIG. 6, it will be evident how the block could be configured to accept a rhomboidal instead of a trapezoidal bit.

In the structures thus far described, the fastening means is a toggle member which, when swung out of the way, frees the bit for removal from the bit holder or socket member, and removal can be accomplished. Other forms of fastening means may be employed in structures in which the bit may be driven into the bit receiving recess in such a way as to displace a resilient locking means which thereafter retains the bit in the recess. The bit may subsequently be removed by a tool which acts to depress the resilient means. An exemplary form of such structure is illustrated in FIG. 9. This structure employs a bit holder as shown, but it will be evident that the socket member may be so constructed as directly to engage the bit without the use of a separate bit holder.

In FIG. 9 the block or socket member 42 is shown as having an opening to receive the shank 43 of a bit holder which is pinned as at 44 or otherwise fastened in position. The bit holder head 45 is recessed to accept a portion of the body of the bit 11. It lies against an upward extension 46 of the block to withstand the rearward cutting stresses; and the block may be recessed as at 47 to accommodate the unused point of the bit.

A resilient latching means is located in a bore 48 in the socket member, which bore slants forwardly and downwardly so that the resilient means is maintained at a proper angle with respect to the front face of the bit. The resilient means comprises a head or plunger-like portion 49 having axial movement within the bore 48. A control shaft 50 may extend inwardly from the head and engage in a suitable guiding perforation in the socket member. Behind the head there is also a body of resilient rubbery substance 51 or other resilient means.

The head 49 is provided with a nose 52 which has an outer point 53 shaped conically or otherwise to coact with the front face of the bit 11. The manner in which the resilient means holds the bit in place will be clear from the drawing.

In the embodiment just described the bit may be installed by a driving operation. If one end of the bit is inserted in the recess in the bit holder head, the bit will displace the resiliently mounted structure 49, 52, 53, after which this structure will engage in front of the bit as shown.

Figure 10:
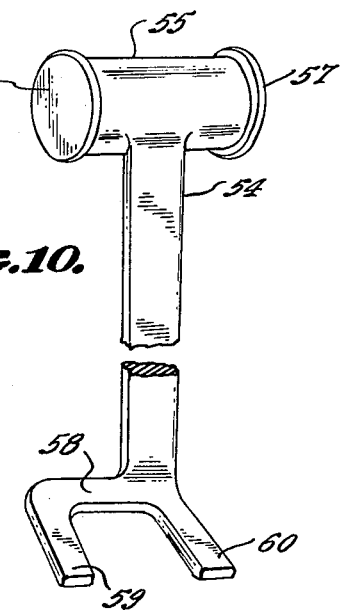
FIG. 10 is a perspective view of an installing and releasing tool which may be employed in the structure of FIG. 9.

A tool, which comprises installing and removing elements, is conveniently provided as shown in FIG. 10. This tool has a shaft or handle portion 54 which is provided with a driving head 55 at one end. This head is faced at either end as at 56 and 57 with some material, metallic or otherwise, which is softer than the material of the cutter bit so that the driving head may be used on the point of the cutter bit without injuring it. A head faced with a layer of copper, lead, bronze or the like will be found suitable.

At the other end of the handle, there is a lateral extension 58 terminating in an angularly related arm 59. Another arm 60 is formed at the end of the shaft. These arms are substantially parallel and both lie at a substantial angle to the shaft 54.

When the tool is used for removing a bit, the arm 59 may be engaged beneath the bit while the arm 60 engages above the shoulder formed between the head 49 and the nose 52 of the resilient latching means. When leverage is then exerted on the tool by means of the handle 54, the arm 60 will depress the head of the resilient latching means, thus freeing the bit while the arm 59 will draw the bit out of the recess of the bit holder. The bit may thus readily be removed while the latching means is rendered inactive.

Modifications may be made in the invention without departing from the spirit of it. The invention having been described in certain exemplary embodiments, what is claimed as new and desired to be secured by Letters Patent is:

1. In a structure of the class described, a block, means in connection with the block providing a recess for accepting a portion of the body of a double ended cutter bit so as to maintain it in cutting position, said means having surfaces to engage said bit to sustain both the rearward and the downward strains of cutting, and resilient means mounted on said block for engaging a forwardly directed face of said cutting bit to maintain said bit in contact with said surfaces and to prevent removal of said bit from said recess, said resilient means being movable while in connection with said block to disengage said forwardly directed face of said cutting bit and to clear the opening of said recess sufficiently to permit free withdrawal of said bit from said recess, said resilient means comprising a toggle element pivoted with respect to said block, and a latching plunger resiliently mounted with respect to said toggle means, said toggle means being swingable from an inactive position in which it releases said bit to an active position in which said latching plunger engages the said forward face of said bit, and means for holding said toggle member in the active position.

2. In a structure of the class described, a block, means in connection with the block providing a recess for accepting a portion of the body of a double ended cutter bit so as to maintain it in cutting position, said means having surfaces to engage said bit to sustain both the rearward and the downward strains of cutting, resilient means mounted on said block for engaging a forwardly directed face of said cutting bit to maintain said bit in contact with said surfaces and to prevent removal of said bit from said recess, said resilient means being movable while in connection with said block to disengage said forwardly directed face of said cutting bit and to clear the opening of said recess sufficiently to permit free withdrawal of said bit from said recess, said resilient means comprising a toggle element pivoted with respect to said block, a latching plunger resiliently mounted with respect to said toggle means, said toggle means being swingable from an inactive position in which it releases said bit to an active position in which said latching plunger engages the said forward face of said bit, means for holding said toggle member in the active position, said toggle member arranged in passing from one to the other of said positions to swing past dead center, and said holding means comprising an abutment on said block to retain said toggle member in said past-dead-center position.

3. The structure claimed in claim 2 wherein said recessed means is integral with said block.

4. The structure claimed in claim 2 wherein said recessed means constitutes a bit holder having a head and a shank, the structure including means for holding the said shank in an opening in said block.

5. The structure claimed in claim 4 wherein the head of said bit holder has rearward engagement with an upstanding abutment on said block to withstand rearward cutting strains.

6. In a structure of the class described, a block, means in connection with the block providing a recess for accepting a portion of the body of a double ended cutter bit so as to maintain it in cutting position, said means having surfaces to engage said bit to sustain both the rearward and the downward strains of cutting, resilient means mounted on said block for engaging a forwardly directed face of said cutting bit to maintain said bit in contact with said surfaces, and to prevent removal of said bit from said recess, said resilient means being pivotally connected with said block, said resilient means being movable to disengage said forwardly directed face of said cutting bit and to clear the opening of said recess sufficiently to permit free withdrawal of said bit from said recess.

References Cited in the file of this patent

UNITED STATES PATENTS

| | | |
|---|---|---|
| 1,325,029 | Morgan | Dec. 16, 1919 |
| 1,430,669 | Morgan | Oct. 3, 1922 |
| 1,797,897 | King | Mar. 24, 1931 |
| 2,148,309 | Stephens | Feb. 21, 1939 |
| 2,155,526 | Bowman | Apr. 25, 1939 |
| 2,156,726 | Fulke | May 2, 1939 |
| 2,168,794 | Fulke | Aug. 8, 1939 |
| 2,190,000 | Stenger et al. | Feb. 13, 1940 |
| 2,907,559 | Brown et al. | Oct. 6, 1959 |